Oct. 12, 1954  B. A. PHILLIPS  2,691,281
HEAT AND MATERIAL TRANSFER APPARATUS
Filed Jan. 16, 1951  2 Sheets-Sheet 2

INVENTOR.
Benjamin A. Phillips
BY
Oliver S. Titcomb
his ATTORNEY

Patented Oct. 12, 1954

2,691,281

UNITED STATES PATENT OFFICE 2,691,281

HEAT AND MATERIAL TRANSFER APPARATUS

Benjamin A. Phillips, Evansville, Ind., assignor to Servel, Inc., New York, N. Y., a corporation of Delaware Application January 16, 1951, Serial No. 206,191

13 Claims. (Cl. 62—119.5)

The present invention relates to heat or material transfer apparatus adapted for use in absorption refrigeration systems and more particularly to a construction for wetting the surface of a heat or material transfer wall above a liquid level.

In the prior patent to William L. O'Brien No. 2,426,044 issued August 19, 1947, apparatus is described and claimed having a wall through which heat is transferred between a fluid on one side and a liquid on the other side to cause a material transfer from the liquid to a vapor state. The wall is only partially immersed in liquid and the liquid is lifted by capillary action to wet the entire surface of the wall above the liquid level. In the illustrated embodiment the apparatus is in the form of a tube through which liquid flows along the bottom and having closely adjacent grooves of capillary dimensions in the surface of its wall extending upwardly from the liquid level in a substantially vertical direction.

The tube illustrated in said patent is particularly adapted for use as an evaporator in an absorption refrigeration system through which refrigerant flows by gravity. The refrigerant rises in the capillary grooves to wet the entire surface of the wall above the liquid level and thereby increases the effective heat transfer surface of the wall and the material transfer rate. As the liquid refrigerant evaporates it is immediately replaced by other liquid from the bottom of the tube. If the tube is used as an absorber, the liquid absorbent will rise in the grooves to wet the entire wall surface and increase the rate of heat transfer. However, the absorbent liquid remains in the grooves and limits the material transfer of refrigerant vapor into the liquid to the amount that can be absorbed before the liquid becomes saturated at the particular operating conditions.

One of the objects of the present invention is to provide a heat or material transfer apparatus having a wall so constructed and arranged as to cause a continuous flow of liquid over the surface of the wall above the liquid level.

Another object is to provide a heat or material transfer apparatus of the type indicated having a gas and liquid contact surface on which liquid is lifted by capillary action and propelled along the surface above the liquid level by a siphon action.

Another object is to provide a heat or material transfer tube inclined to the horizontal so that liquid will flow along its bottom and having long lead helical grooves of capillary dimensions to provide a drop in each helix sufficient to siphon liquid along the groove.

Another object is to provide a heat or material transfer tube of type indicated having capillary siphoning grooves and capillary distributing means for delivering liquid to the end of each groove around the entire periphery of the tube.

Still another object of the invention is to provide an absorber of an absorption refrigeration system with a tube having capillary siphoning grooves in its wall surface above the liquid level and a baffle cooperating with the grooves for directing vapor to be absorbed into contact with absorption liquid in the grooves.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawing:

Figure 1:
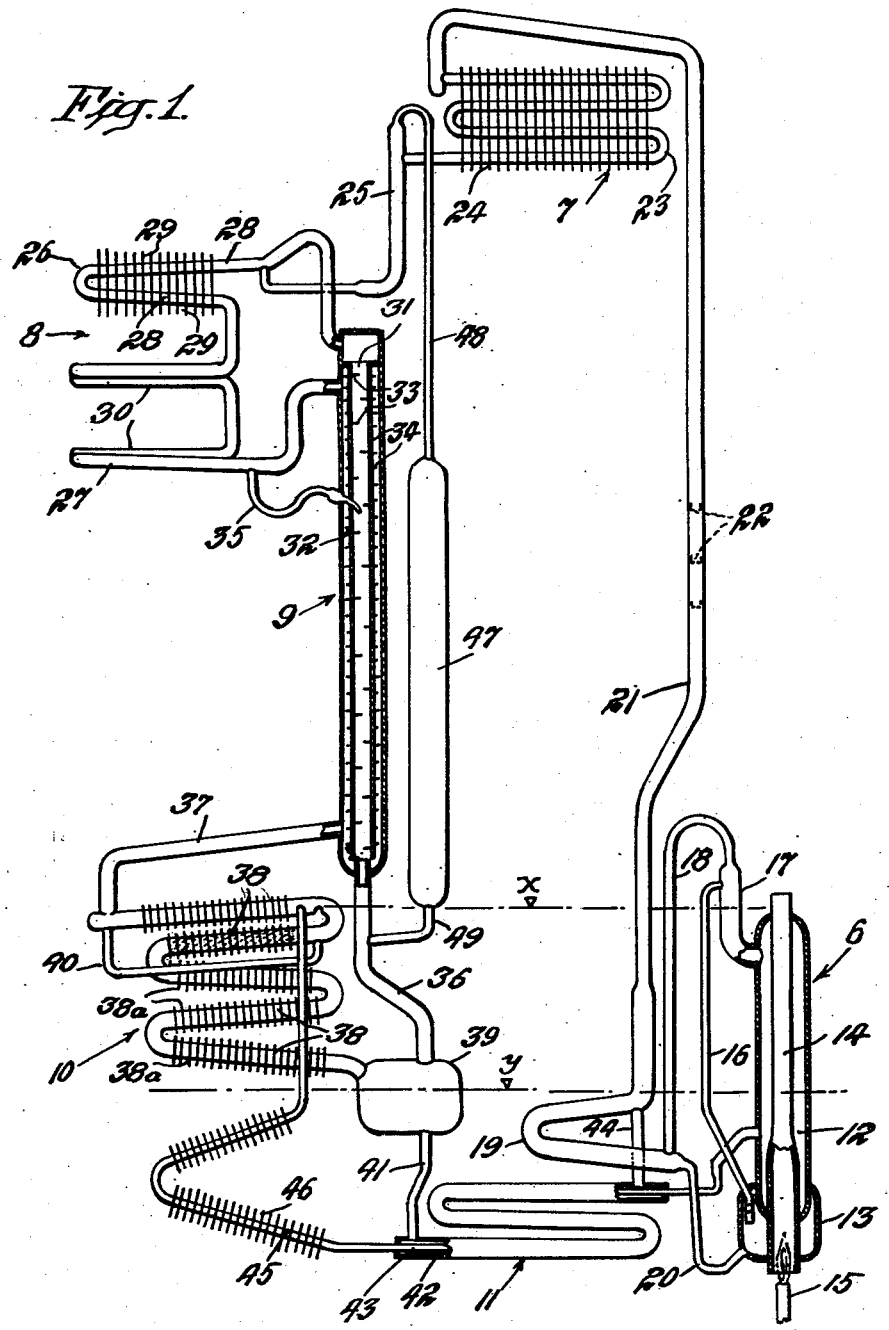
Fig. 1 is a diagrammatic view of an absorption refrigerating system having heat and material transfer apparatus incorporating the novel features of the present invention.

The present invention is shown applied to a conventional absorption refrigeration system of the three-fluid type comprising a generator 6, a condenser 7, an evaporator 8, a gas heat exchanger 9, an absorber 10 and a liquid heat exchanger 11 interconnected for the gravity flow of a refrigerant, absorbent and pressure equalizing gas. In the illustrated embodiment, the generator 6 has separate generating and liquid lift chambers 12 and 13 with a common vertical heating flue 14 extending therethrough. Heat may be supplied to the flue 14 from any suitable source such as a gas burner 15 or the like. A vapor liquid lift tube 16 extends upwardly from the chamber 13 to a standpipe 17 projecting from the top of the generating chamber 12 and is connected thereto at a point above the liquid level $x$. From the top of the standpipe 17 a gooseneck vapor pipe 18 is connected to the bottom of a hairpin-shaped analyzer 19. The bottom of the analyzer 19 is connected to the lift chamber 13 by a conduit 20 and the top of the analyzer is connected to the inlet of a condenser 7 by a vapor pipe 21 having rectifier baffles 22 therein.

The condenser 7 is in the form of a vertically arranged serpentine coil 23 having fins 24 thereon. The lower or outlet end of the condenser coil 7 is connected to the top of the evaporator 8 by a pipe 25.

The evaporator 8 comprises a high temperature section 26 and a low temperature section 27 connected in series for the gravity flow of refrigerant therethrough. The high temperature section 26 is of hairpin-shape having connected inclined tubes 28 provided with fins 29. The low temperature section 27 consists of a plurality of horizontally arranged coils 30 to provide shelves for ice freezing trays or the like. The upper end of the high temperature evaporator section 26 is connected to the inner passage 31 of the gas heat exchanger 9 and the lower end of the low temperature section 27 is connected to the outer passage 32 of the gas heat exchanger. The gas heat exchanger 9 is formed by two concentric tubes and has baffles 33 and 34 for creating a turbulence in the gas flowing therethrough. A refrigerant overflow conduit 35 depends from the bottom coil of the low temperature section 27 of evaporator 8, is bent to form a liquid trap therein and its opposite end projects into the inner passage 31 of the gas heat exchanger. The lower ends of the inner and outer passages 31 and 32 of gas heat exchanger 9 are connected to the bottom and top of the absorber 10 by conduits 36 and 37, respectively.

Absorber 10 is formed by a vertically arranged serpentine coil formed by a plurality of inclined tubes 38 connected to each other in series with fins 38a on each tube and an absorber pot 39. The uppermost tube section 38 of the coil is inclined downwardly from the right toward the left as viewed in Fig. 1 and the successive coil sections are inclined away from each other to cause a continuous flow of liquid from the top to the bottom of the coil. A conduit 40 connects the outer or left-hand end of the upper tube section 38 to the top or right-hand end of the next lowermost tube section for a purpose as will later appear. The lower end of the lowermost tube section 38 and the end of the conduit 36 are connected to the top of the absorber pot 39 above the liquid level $y$. The bottom of absorber pot 39 is connected by a conduit 41 to the outer passage 42 of the liquid heat exchanger 11.

The liquid heat exchanger 11 is in the form of concentric tubes bent in the form of a coil to conserve space and provide the outer passage 42 and an inner passage 43. The opposite end of the outer passage 42 is connected to the top of the analyzer 19 at or below the liquid level $y$ by a conduit 44. One end of the inner passage 43 of the liquid heat exchanger 11 is connected to the chamber 12 of generator 6 and the opposite end is connected to a cooling coil 45 having fins 46 which, in turn, is connected to the top or right-hand end of the uppermost coil section 38 of the absorber 10 at or slightly below the liquid level $x$.

A pressure vessel 47 is connected at its upper end to conduit 25 adjacent the condenser 7 by a pipe 48 and connected at its lower end to conduit 36 by a pipe 49. The pressure vessel 47 is adapted to store a reserve supply of pressure equalizing gas and automatically deliver the gas for circulation in the system upon an increase in pressure in the system.

In accordance with the present invention certain of the elements such as the evaporator 8 and absorber 10 have heat transfer walls so constructed and arranged as to cause liquid to continuously flow over their surface above the liquid level. The construction comprises a plurality of closely adjacent grooves of capillary dimensions in the surface of the wall and arranged so as to utilize a combined capillary and siphon action. Each groove has one leg ascending to the top of the wall in which liquid is lifted from one level by capillarity and a descending leg through which the raised liquid is siphoned downwardly to a lower level.

Figure 2:
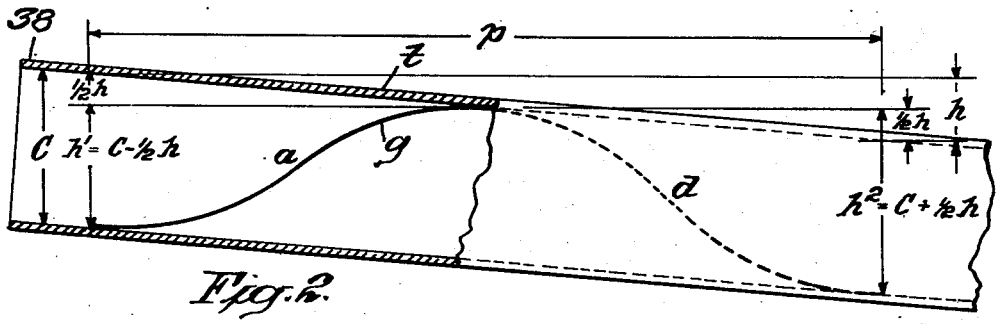
Fig. 2 is a partial sectional view of a tube shown with a single groove formed in the wall thereof to illustrate the combined capillary lifting and siphon flow of liquid along the tube above the liquid level.

While the grooved wall construction may take other forms, in the illustrated embodiment it comprises the tubes 28 of the high temperature section 26 of evaporator 8 and the tubes 38 of the absorber 10. Each tube 28 or 38 is inclined to the horizontal and has a plurality of closely adjacent long lead helical grooves $g$ in its interior wall surface. Liquid supplied to the upper end of a tube will flow along its bottom by gravity and a portion of the liquid will be lifted in each groove above the liquid level by capillary action and be propelled along the groove above the liquid level by a siphon action. To more clearly illustrate and describe the action, a portion of a tube 28 or 38, hereinafter referred to as tube $t$, is illustrated in Fig. 2 having a single helical groove $g$ and inclined to the horizontal to produce a drop $h$ in a length $p$ equal to the lead of the helical groove. Liquid supplied to the bottom of groove $g$ at the upper end of tube $t$ climbs to the top thereof in the ascending portion $a$ by capillary action to a height $h_1$ equal to a distance from the top to the bottom of the tube in a vertical direction C less a drop of $\frac{1}{2}h$ due to the inclination of the tube or $C - \frac{1}{2}h$. Liquid will continue to creep along the descending portion $d$ of the groove or may be lifted in the descending portion until the liquids in the two parts of the groove meet. The liquid in the descending portion $d$ of groove $g$ has a height $h_2$ equal to $C + \frac{1}{2}h$. As the force of capillarity in the ascending and descending portions $a$ and $d$ are equal and as the height $h_2$ of the liquid in $d$ is greater than the height $h_1$ of liquid in $a$, a resulting gravity force is produced causing a flow of raised liquid down the descending portion $d$ of the groove. Thus, the groove $g$ constitutes a siphon which is automatically primed by capillary action to cause liquid to continuously flow along the groove above the liquid level.

Figure 3:
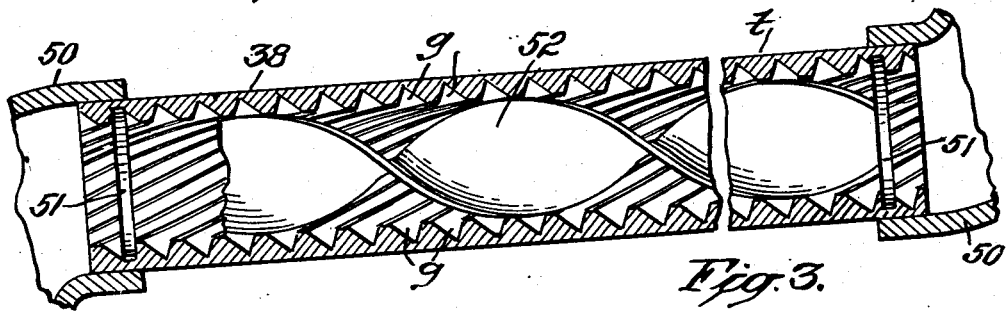
Fig. 3 is a view similar to Fig. 2 showing a tube having a plurality of closely adjacent helical grooves with a capillary peripheral groove at each end and a helical baffle therein.

To wet the entire surface of the tube $t$ above the liquid level a plurality of such grooves $g$ are provided in the surface of the tube $t$ in closely adjacent relationship as illustrated in Fig. 3. In this construction liquid is supplied to the upper end of the tube $t$ from the lower end of the tube above and liquid is delivered from its lower end to the upper end of the next lowermost tube by elbows 50. In order to utilize the entire surface of the tube $t$ a peripheral capillary groove 51 is provided at each end to feed liquid to each groove at the upper end of the tube and to deliver liquid from each groove at the lower end of the tube. A helically twisted baffle 52 is also illustrated in the tube which cooperates with the grooves $g$ to create a turbulence of the gas flowing through the tube and insure contact of the gas with the liquid in the groove.

Figure 4:
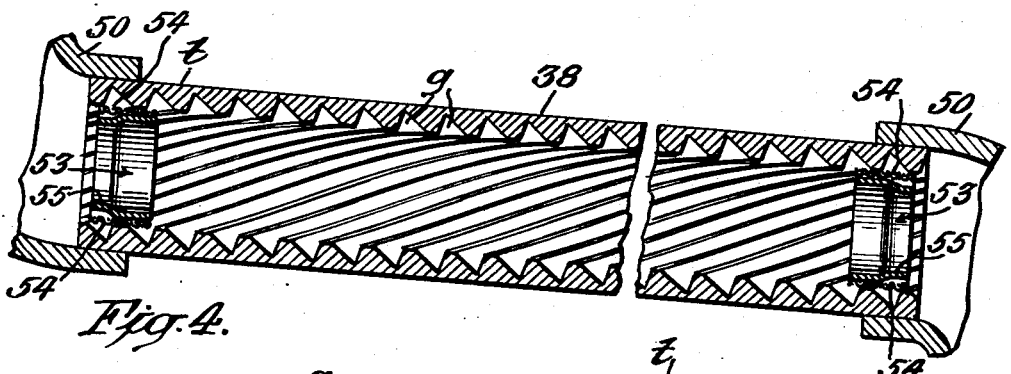
Fig. 4 is a view similar to Fig. 3 showing a capillary liquid feeding and delivering means of modified construction at each end of the tube.

In Fig. 4 a modified construction of capillary device 53 is illustrated for supplying liquid to each of the grooves $a$ at the upper end of the tube and delivering liquid from the grooves at the lower end of the tube. This form of construction comprises an annular section of wire screening or other wick material 54 held in place by an annular ring 55. Liquid supplied to the bottom of the distributing device 53 from elbow 50 will climb up the sides of the tube in the capillary material 54 to supply liquid to the ends of all of the grooves $g$ and liquid will be delivered to the elbow 50 for flow to the next lowermost tube by the capillary device at the lower end of the tube.

Figure 5:
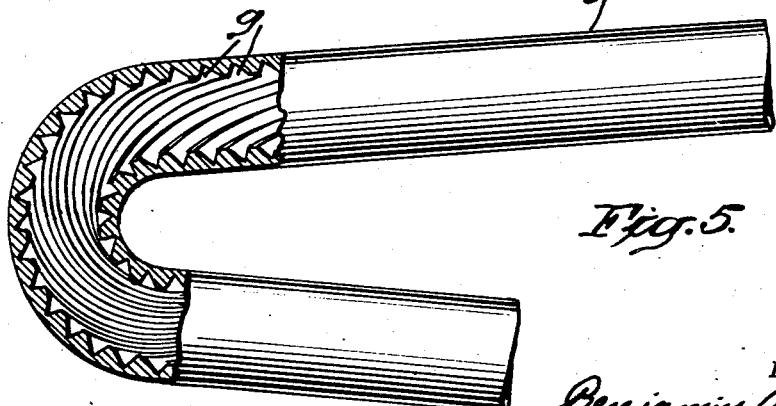
Fig. 5 is a view of a single tube having capillary grooves on the wall thereof and bent intermediate its ends to form a plurality of inclined sections.

In Fig. 5 a still further modified construction is illustrated in which a single length of grooved tube $t$ is bent to a serpentine coil of inclined straight sections so that liquid delivered from the end of one inclined section will be fed to the top of the next lowermost section without the need of any capillary liquid distributing means as illustrated in Figs. 3 and 4.

While the grooved tube construction of the present invention will operate advantageously in an evaporator to wet the wall surface above a liquid level and prevent the accumulation of any absorbent thereon, it is particularly advantageous in an absorber to increase the transfer of refrigerant vapor into absorption solution. The tilt of tube $t$ and lead $p$ of the helical grooves $g$ may vary over a considerable range and the tube may have any length greater than the lead of the groove and preferably a length which is a multiple of the lead length. The number, width and depth of groove $g$ must be proportioned to the liquid rate to give the best performance. In other words, there should be enough grooves $g$ of the proper size to utilize all of the available liquid supplied to the element but few enough so that all of the grooves will be filled with liquid. It has been found that absorber tubes 16 inches long having an inside diameter from ½ inch to ¾ inch when used in a household refrigeration apparatus may have grooves with a lead length from 2 inches to 16 inches when the tube is tilted or slanted 1 inch in 16 inches of length. Such an absorber tube 38 has been found to produce from 2 to 2½ times as much absorption per unit of area as the absorber tubes previously used. This improvement may be used either to reduce the number of tubes and cost of the absorber 10 or to improve the performance of the apparatus to produce a lower evaporator temperature. One form of the invention having now been described in detail, the mode of operation of the apparatus is explained as follows.

To initiate operation of the apparatus, burner 15 is ignited and the products of combustion flow through and heat the flue 14. Heat is transmitted through the flue 14 to the solution in the chambers 12 and 13 which expels refrigerant vapor, such as ammonia, from absorption solution, such as water. Refrigerant vapor expelled from solution in chamber 13 operates to lift slugs of solution through the lift tube 16 into the standpipe 17 to fill the chamber 12 to the level $x$ at which it overflows into the absorber 10. The vapor expelled in both chambers 12 and 13 flows through the vapor tube 18 to the analyzer 19, through the analyzer in direct contact with solution strong in refrigerant flowing toward the generator 6 and then through the vapor pipe 21 and rectifier 22 to the condenser 7 where the refrigerant vapor is liquefied. Due to the elevation of the condenser 7, liquid refrigerant flows by gravity through the high and low temperature sections 26 and 27 of the evaporator 8 successively.

Simultaneously, absorption solution from which refrigerant vapor has been expelled or, in other words, solution weak in refrigerant flows by gravity from the chamber 12 of generator 6 through the inner passage 43 of liquid heat exchanger 11 and cooling coil 45 to the uppermost tube 38 of the absorber 10 at the level $x$. The absorption solution then flows downwardly through the uppermost inclined tube 38 of absorber 10, through conduit 40 into the upper end of the next lowermost tube, and then successively through each tube 38 into the absorber pot 39 to the liquid level $y$.

The initial flow of solution through the uppermost tube section 38 and the absorption of ammonia vapor from pressure equalizing gas such as hydrogen in the absorber 10 causes an initial upward movement of gas weak in refrigerant through conduit 37 and outer passage 32 of the gas heat exchanger 9 and an initial downward movement of gas strong in refrigerant through the inner passage 31 of the gas heat exchanger and absorber pot 39 into the lower end of the absorber coil. Thus a gravity circulation of inert pressure equalizing gas is initiated through the evaporator 8 in a direction countercurrent to the flow of liquid refrigerant therethrough. The liquid refrigerant in the evaporator 8 evaporates and diffuses into gas weak in refrigerant flowing therethrough at a partial vapor pressure and low temperature to produce a refrigerating effect. In the absorber 10 ammonia vapor is absorbed from the gas strong in refrigerant into solution weak in refrigerant flowing downwardly therethrough. The gas weak in refrigerant in the outer passage 32 is lighter than the gas strong in refrigerant in the inner passage 31 of the gas heat exchanger 9 to maintain the gravity circulation of the gas which is augmented by any refrigerant overflowing through conduit 35. The heat of vaporization is continuously transferred through the tubes 28 of evaporator 8 at low temperature to evaporate the ammonia at partial pressure therein and the heat of absorption is continuously ejected from the tubes 38 of the absorber 10 at a higher temperature.

The absorption solution strong in refrigerant flows to the level $y$ in absorber pot 39 and from the absorber pot through the conduit 41, outer passage 42 of liquid heat exchanger 11, conduit 44 to analyzer 19 and from analyzer 19 through conduit 20 to the lift chamber 13 of generator 6 to complete the cycle of operation. Upon an increase in pressure and temperature in the condenser 7 refrigerant vapor overflowing from the condenser enters the top of the pressure vessel 47 through conduit 48 and displaces the inert gas therein to cause it to circulate in the system and thereby compensate for the increase in pressure and temperature.

The liquid refrigerant in each inclined tube 28 of high temperature section 26 of evaporator 8 or liquid absorbent in each tube 38 of the absorber 10 flows along the bottom of the tube from the upper to the lower end. A portion of the liquid entering the upper end of the tube is lifted by the capillary peripheral groove 51, see Fig. 3, or by the capillary material 54, see Fig. 4, to feed liquid to the end of each of the grooves $g$ around the entire periphery of the tube. The liquid supplied to the ends of the grooves g climbs to the top of the tube in each ascending portion a of the grooves by capillary action and then flows down the descending leg of the groove to a lower level by siphon action to cause the liquid to continuously flow along the grooves above the liquid level over its entire surface. The liquid delivered from the bottom of grooves g then flows along the bottom of the tube and enters subsequent grooves along the length of the tube. As the number, width and depth of the grooves are properly proportioned with respect to the amount of liquid supplied, the entire surface of the successive tubes will be completely wetted with the liquid above the liquid level. The baffle 52 in each of the tubes 28 or 38 directs gas into contact with the wetted wall surface and creates a turbulence in the gas to enhance the gas and liquid contact over the entire surface of the tube and the wetted wall surface increases the heat transfer through the tubes and the material transfer in the tubes.

It will now be observed that the present invention provides a construction of heat or material transfer apparatus to cause a continuous flow of liquid over the walls of the apparatus above the liquid level. It will also be observed that the present invention provides a heat or material transfer apparatus having capillary grooves in the walls thereof so constructed and arranged as to utilize a combined capillary and siphon action to cause liquid to flow continuously through the grooves. It will still further be observed that the present invention provides an absorber tube having long lead helical grooves therein arranged to continuously flow absorption solution along the wall surface above the liquid level and generally improve the operating characteristics of the tube.

While several forms of the invention are herein illustrated and described it will be understood that further modifications may be made in the construction and arrangement of elements without departing from the spirit or scope of the invention. The term "heat or material transfer" as used in the specification and claims is intended to include either an apparatus in which heat is transferred or an apparatus in which a material changes from vapor to liquid phase or vice versa or an apparatus in which both a heat and material transfer occurs. Also the term "siphon" as used in the specification and claims is intended to include any construction of capillary groove for producing a continuous flow of liquid from one level to a lower level through an intermediate higher level. Therefore, without limitation in this respect, the invention is defined by the following claims.

I claim:

1. In an absorption refrigeration system utilizing a refrigerant, an absorbent and a pressure equalizing gas, an absorber arranged for gravity flow of absorption solution therethrough, said absorber having an inclined heat transfer wall only partially immersed in the absorption liquid with capillary grooves therein extending upwardly from the liquid level, each of said grooves having an ascending portion and a lower descending portion arranged to provide a siphon for the continuous flow of absorption liquid therealong above the liquid level, and a structure cooperating with the grooves to create a turbulence in gas flowing through the absorber and direct the gas into contact with the liquid in the grooves.

2. An absorption refrigeration system utilizing a refrigerant, an absorbent and a pressure equalizing gas, an absorber having a tube inclined to the horizontal, long lead helical grooves in the interior surface of the tube, each of the grooves having an ascending portion and a descending portion with a lead sufficient to produce a siphon action along the groove, means for supplying absorption liquid to the upper end of the tube for gravity flow along the bottom thereof, annular capillary means at the upper and lower ends of the tube for supplying absorption liquid to all of the grooves at one end and delivering absorption liquid from all of the grooves at the opposite end of the tube, and a helical baffle in the tube cooperating with the grooves to direct the gas into contact with the liquid in the grooves and create a turbulence in the gas flowing through the tube.

3. In an absorption refrigeration system, a heat or material transfer device for a liquid absorbent comprising a wall inclined at an acute angle to the horizontal to provide a predetermined slope, said wall having capillary grooves in its surface extending at an angle of less than 50 degrees to a line on the wall parallel to its slope, means for supplying liquid to the grooves at the upper end of said wall, and said grooves utilizing the combined forces of capillarity and gravity to cause liquid to continuously flow along the grooves longitudinally of the wall above the bottom thereof.

4. In an absorption refrigeration system, a heat or material transfer device for a liquid absorbent comprising a wall inclined at an acute angle to the horizontal, said wall having a plurality of separate parallel grooves with each groove comprising an ascending leg and a descending leg along the inclined wall, the bottom of said ascending and descending legs being spaced longitudinally of the inclined wall a distance greater than the vertical rise of the ascending leg to provide a siphon in which liquid continuously flows along the wall above the bottom thereof.

5. In an absorption refrigeration system, a heat or material transfer device for a liquid absorbent comprising a wall inclined at an acute angle to the horizontal, means for supplying liquid for gravity flow in a primary stream along the bottom of the inclined wall, said wall having a plurality of adjacent capillary grooves over its entire surface with each groove extending upwardly from and then downwardly to the primary stream at points spaced longitudinally of the wall a distance greater than the space between adjacent grooves, a separate capillary feeding means for supplying liquid from the primary stream to all of the grooves at the upper end of the wall, and means comprising a correlation of the lead length of the grooves between the spaced points and the inclination of the wall for utilizing the combined forces of capillarity and gravity to cause the liquid to continuously flow in secondary streams along the wall above the level in the primary stream.

6. In an absorption refrigeration system, a heat or material transfer device for liquid absorbent comprising a tube inclined at an acute angle to the horizontal, the wall of said tube having a plurality of separate capillary grooves therein arranged in spaced parallel relation over its surface and extending at an angle of less than 50 degrees to a line on the wall parallel to the axis of the tube, means for supplying liquid to all of the grooves at the upper end of said tube, and said grooves utilizing the combined force of capillarity and gravity to cause a continuous flow of liquid along the grooves longitudinally of the inclined tube.

7. In an absorption refrigeration system, a heat or material transfer device for liquid absorbent comprising a tube arranged with its axis inclined to the horizontal, means for supplying absorption liquid to the upper end of said inclined tube, said tube having a plurality of adjacent helical grooves in its surface, each of said grooves having ascending and descending legs with a lead length greater than the space between adjacent grooves, and means comprising a correlation of the lead length of the grooves and the inclination of the tube to produce a continuous flow in the grooves along the inclined wall above its bottom.

8. A heat or material transfer tube in accordance with claim 7 in which a capillary liquid feeding means is provided at the upper end of the tube to supply liquid to the ends of the grooves around the entire periphery of the tube.

9. A heat or material transfer tube in accordance with claim 7 in which capillary means are provided at the upper and lower ends of the tube for supplying liquid to one end of the grooves and delivering liquid from the grooves at the other end of the tube.

10. A heat or material transfer tube in accordance with claim 9 in which the capillary means at the upper and lower ends of the tube are circular grooves extending around the entire periphery of the tube.

11. A heat or material transfer tube in accordance with claim 9 in which the capillary means at the upper and lower ends of the tube are circular wicks extending around the entire periphery of the tube.

12. A heat or material transfer tube in accordance with claim 7 in which the tube is bent to provide a vertically arranged serpentine coil with overlying sections inclined to the horizontal.

13. A heat or material transfer tube in accordance with claim 7 in which the helical grooves are located in the interior surface of the tube and a helical baffle in the tube cooperates with the grooves to direct gas in contact with the liquid in the grooves and create a turbulence in the gas flowing through the tube.

References Cited in the file of this patent

UNITED STATES PATENTS

| Number | Name | Date |
|---|---|---|
| 2,133,819 | Howse | Oct. 18, 1938 |
| 2,279,548 | Bailey | Apr. 14, 1942 |
| 2,307,947 | Payne | Jan. 12, 1943 |
| 2,350,347 | Gaugler | June 6, 1944 |
| 2,408,480 | Reid | Oct. 1, 1946 |
| 2,426,044 | O'Brien | Aug. 19, 1947 |
| 2,434,519 | Raskin | Jan. 13, 1948 |
| 2,517,654 | Gaugler | Aug. 8, 1950 |
| 2,565,221 | Gaugler | Aug. 21, 1951 |
| 2,583,769 | Gaugler | Jan. 29, 1952 |

FOREIGN PATENTS

| Number | Country | Date |
|---|---|---|
| 436,910 | Italy | 1948 |